(12) United States Patent
Johnson et al.

(10) Patent No.: US 11,655,014 B2
(45) Date of Patent: May 23, 2023

(54) BOAT SHAFT SEAL SYSTEM (71) Applicant: Johnson Propeller Co., Inc., Loudon, TN (US)

(72) Inventors: Eric Johnson, Knoxville, TN (US); Clint Brown, Lenoir City, TN (US)

(73) Assignee: Johnson Propeller Co., Inc., Loudon, TN (US)

( * ) Notice: Subject to any disclaimer, the term of this patent is extended or adjusted under 35 U.S.C. 154(b) by 0 days.

(21) Appl. No.: 17/020,157

(22) Filed: Sep. 14, 2020

(65) Prior Publication Data

US 2021/0078688 A1 Mar. 18, 2021

Related U.S. Application Data (60) Provisional application No. 62/899,359, filed on Sep. 12, 2019.

(51) Int. Cl.
*F16J 15/3284* (2016.01)
*B63H 23/32* (2006.01)

(52) U.S. Cl.
CPC ........ *B63H 23/321* (2013.01); *F16J 15/3284* (2013.01); *B63H 2023/323* (2013.01); *B63H 2023/327* (2013.01)

(58) Field of Classification Search
CPC ...... F16J 15/3284; F16J 15/52; B63H 23/321; B63H 2023/323; B63H 2023/327
See application file for complete search history.

(56) References Cited

U.S. PATENT DOCUMENTS

| | | | |
|---|---|---|---|
| 2,761,709 A | 9/1956 | Gilbert, Sr. | |
| 3,050,310 A | 8/1962 | Kuiken | |
| 3,088,744 A | 5/1963 | Ezekiel et al. | |
| 3,291,491 A | 12/1966 | Smith | |
| 3,400,937 A | 9/1968 | Crankshaw | |
| 3,413,008 A | 11/1968 | Greiner | |
| 3,444,932 A | 5/1969 | Wlezien | |
| 3,547,452 A | 12/1970 | Hirata | |
| 3,580,214 A | 5/1971 | Muller | |
| 3,599,990 A | 8/1971 | Greiner et al. | |
| 3,612,550 A | 10/1971 | Wilkinson | |
| 3,637,222 A | 1/1972 | Wilkinson | |
| 3,773,336 A | 11/1973 | Walter et al. | |
| 3,854,732 A | 12/1974 | Franz et al. | |
| 4,293,304 A * | 10/1981 | Sandstrom | B63H 21/305 440/83 |
| 4,395,141 A | 7/1983 | Pietsch et al. | |

(Continued)

FOREIGN PATENT DOCUMENTS

| | | |
|---|---|---|
| DE | 898979 C1 | 12/1953 |
| DE | 1241726 B | 11/1967 |

(Continued)

*Primary Examiner* — Gilbert Y Lee
(74) *Attorney, Agent, or Firm* — Pitts & Lake, P.C.

(57) ABSTRACT

A boat shaft seal system including a flexing gland configured to receive a boat drive shaft therethrough, the flexing gland having a first end configured to receive a shaft log fitting, and a second end configured such that the boat drive shaft extends therefrom, and a plurality of circumferential ribs formed along at least a portion of a length of the flexing gland and configured to allow limited flexing of the flexing gland.

16 Claims, 5 Drawing Sheets

(56) References Cited

U.S. PATENT DOCUMENTS

| | | | |
|---|---|---|---|
| 4,936,593 A * | 6/1990 | Finney | B63H 23/321 |
| | | | 277/391 |
| 4,938,726 A * | 7/1990 | Bland | B63H 20/02 |
| | | | 440/112 |
| 5,639,098 A * | 6/1997 | MacDonald | B63H 23/321 |
| | | | 277/391 |
| 5,911,607 A | 6/1999 | Lacko et al. | |
| 6,758,707 B2 | 7/2004 | Creighton | |
| 8,622,779 B2 | 1/2014 | Brouillette et al. | |
| 2012/0003886 A1 * | 1/2012 | Brouillette | B63H 23/36 |
| | | | 440/112 |
| 2017/0043852 A1 | 2/2017 | Gilk et al. | |

FOREIGN PATENT DOCUMENTS

| | | |
|---|---|---|
| DE | 2004858 A1 | 8/1970 |
| DE | 2010527 A1 | 10/1970 |
| DE | 1775722 A1 | 8/1971 |
| DE | 2101120 A1 | 10/1972 |
| DE | 2918418 C2 | 11/1983 |
| DE | 3050514 C2 | 3/1986 |
| DE | 3319040 C2 | 5/1994 |
| DE | 19842031 A1 | 4/2000 |
| EP | 2452871 A1 | 5/2012 |
| EP | 3010797 B1 | 12/2018 |
| FR | 1434989 A | 4/1966 |
| FR | 1579882 A | 8/1969 |
| FR | 2036663 A5 | 12/1970 |
| FR | 2095487 A5 | 2/1972 |
| FR | 2444209 A1 | 7/1980 |
| FR | 2955557 A1 | 7/2011 |
| GB | 762998 A | 12/1956 |
| GB | 1058899 A | 2/1967 |
| GB | 1235272 A | 6/1971 |
| GB | 1246120 A | 9/1971 |
| GB | 1269285 A | 4/1972 |
| GB | 1269571 A | 4/1972 |
| GB | 1304986 A | 1/1973 |
| GB | 1381051 A | 1/1975 |
| WO | WO905100 A1 | 2/1996 |
| WO | WO2011004456 A1 | 1/2011 |
| WO | WO2014202516 A1 | 12/2014 |
| WO | WO2019097816 A1 | 5/2019 |

* cited by examiner

BOAT SHAFT SEAL SYSTEM

CROSS-REFERENCE TO RELATED APPLICATIONS

This application claims the benefit of U.S. Provisional Patent Application Ser. No. 62/899,359, filed on Sep. 12, 2019, which is incorporated herein in its entirety by reference.

FIELD OF INVENTION

The present general inventive concept relates to a boat shaft seal system, and, more particularly, to a boat shaft seal system configured to operate without liquid cooling.

BACKGROUND

Figure 1:
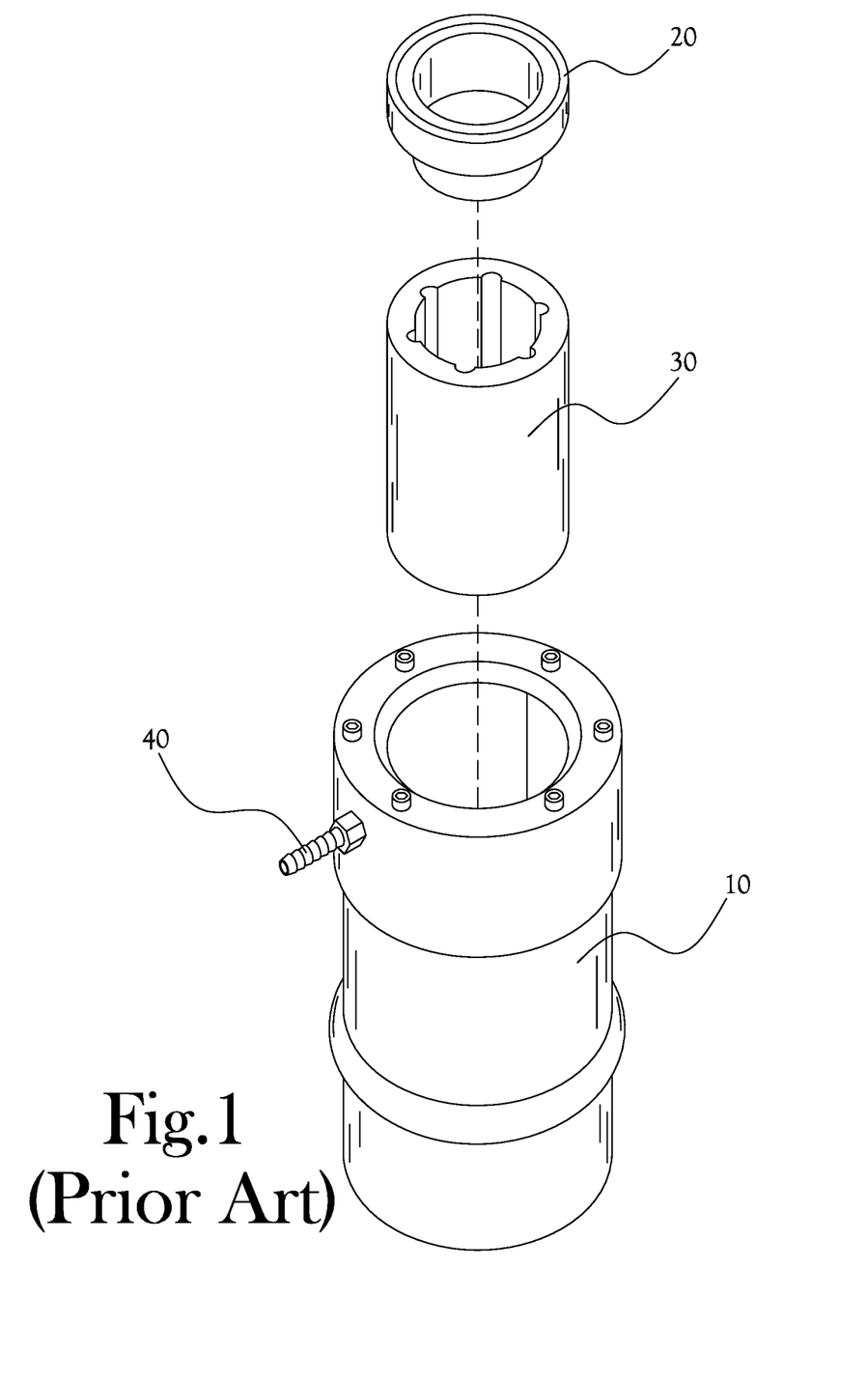
FIG. 1 illustrates a partially exploded view of a conventional boat shaft seal according to the prior art.

Power boats with inboard engines typically have a drive shaft extending from an inside of the hull to a propeller assembly outside the hull. In order to seal this connection so that water does not enter the hull, a sealing sleeve, or seal, is provided over a first portion of the drive shaft extending from the boat. A conventional drive shaft sealing sleeve, such as that illustrated in FIG. 1, has a sleeve portion 10 that is slid over the drive shaft to abut the hull or a fixing member abutting the hull, and a ring bearing 20 or other such rolling element at the distal end of the sealing sleeve to fit and hold the drive shaft with a spinning member. To prevent excessive flexing of the seal, a rigid guide member 30 is provided within the seal assembly that fits over the drive shaft with a loose enough fit that the drive shaft is able to spin inside while the guide member stays stationary. As the friction from this arrangement is prone to produce an excessive amount of heat, a barb 40 is provided that extends from the sealing assembly to allow a cooling water hose to deliver water inside the sealing system to cool the generated heat. Such a cooling mechanism/operation introduces complexity to the system that would preferably be avoided, and also provides more chances for mechanical problems due to the added aperture and componentry outside the sleeve portion 10. Therefore, it would be desirable to provide a sealing assembly that eliminates such friction, and therefore eliminates the need for a cooling liquid to be introduced inside the assembly.

BRIEF SUMMARY

According to various example embodiments of the present general inventive concept, a boat shaft seal system is provided that with a flexing gland having an improved structure to inhibit excessive flexing and therefore eliminate the need for a guiding member and cooling system.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a boat shaft seal system including a flexing gland configured to receive a boat drive shaft therethrough, the flexing gland having a first end configured to receive a shaft log fitting, and a second end configured such that the boat drive shaft extends therefrom, and a plurality of circumferential ribs formed along at least a portion of a length of the flexing gland and configured to allow limited flexing of the flexing gland.

The foregoing and/or other aspects and advantages of the present general inventive concept may also be achieved by providing a boat shaft seal system including a flexing gland having a first end configured to be coupled to a boat hull over a boat drive shaft, and a second end configured such that the boat drive shaft passes therethrough, one or more circumferential ribs formed along at least a portion of the flexing gland and configured to allow limited flexing of the flexing gland, a plurality of structural rings provided on either side of each of the one or more circumferential ribs, a rotary bearing having an internal race configured fit the boat drive shaft and allow rotary movement of the boat drive shaft, an adapter arranged in the second end of the flexing gland such that an outer diameter of the adapter contacts an inner diameter of the flexing gland, and configured such that an inner diameter of the adapter contacts an outer diameter of the rotary bearing, and a tension member provided proximate the second end of the flexing gland and configured to contact an outer diameter of the second end of the flexing gland so as to secure the adapter in position Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to various example embodiments of the present general inventive concept, a boat shaft seal is provided to receive a drive shaft of a powerboat, such as a towing boat, and that eliminates the need of using flowing water to cool the shaft rotating therein. Various example embodiments of the boat shaft seal include a flexing gland with multiple protruding ribs, or humps, defined by pinch points for articulation. As described and shown in the drawings, these ribs protrude outward from an outer surface of the seal, typically forming corresponding grooves on an inner surface of the seal. Thus, the shaft may move fore, aft, side-by-side, etc., with the flexible gland articulating to accommodate the movement of the shaft as caused by it serving as part of the drive-train between the transmission and the propeller. The flexible gland of the present general inventive concept assists in enabling the shaft seal to accommodate misalignment. In various example embodiments, the boat drive shaft passes through a rolling-element bearing having an internal race secured within an adapter at the end of the gland nearest the propeller. The internal race of the rolling-element bearing may define a diameter proportioned for receiving the shaft therein in a force fit. The bearing may be secured into place by a suitable securing member, such as, for example, a lock ring received within a circular groove in the adapter on an interior portion of the seal. The opposite end portion of the seal through which the shaft extends may be secured proximate an opening in the boat hull by a suitable fitting that is partially inserted into the elongated, flexible gland. The addition of the flexible gland and securement of the shaft within the cylindrical bearing facilitates the reduction of heat generated during rotation of the shaft while the boat is being driven, and eliminates the need for an external water cooling system.

Figure 2:
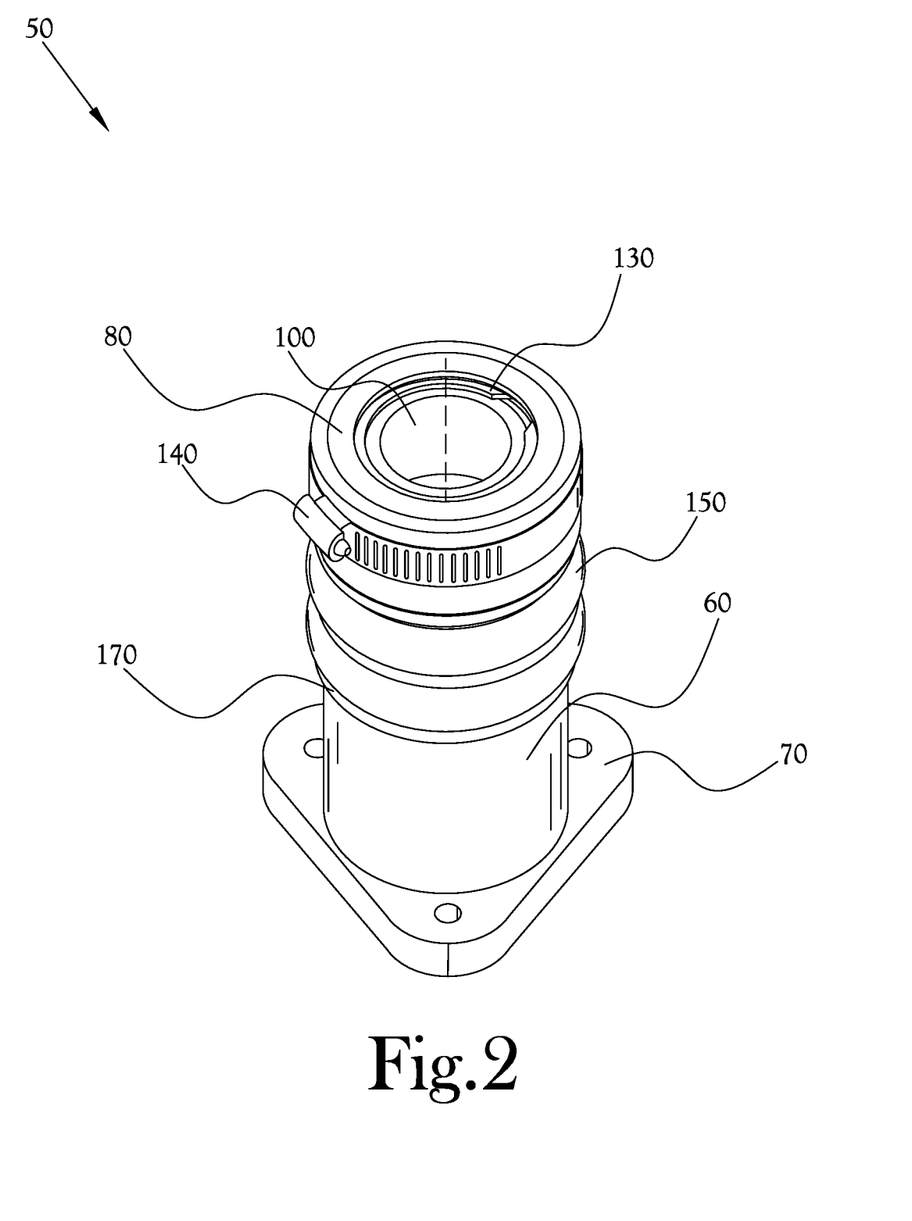
FIG. 2 illustrates a perspective view of a boat shaft seal system according to an example embodiment of the present general inventive concept.
Figure 3:
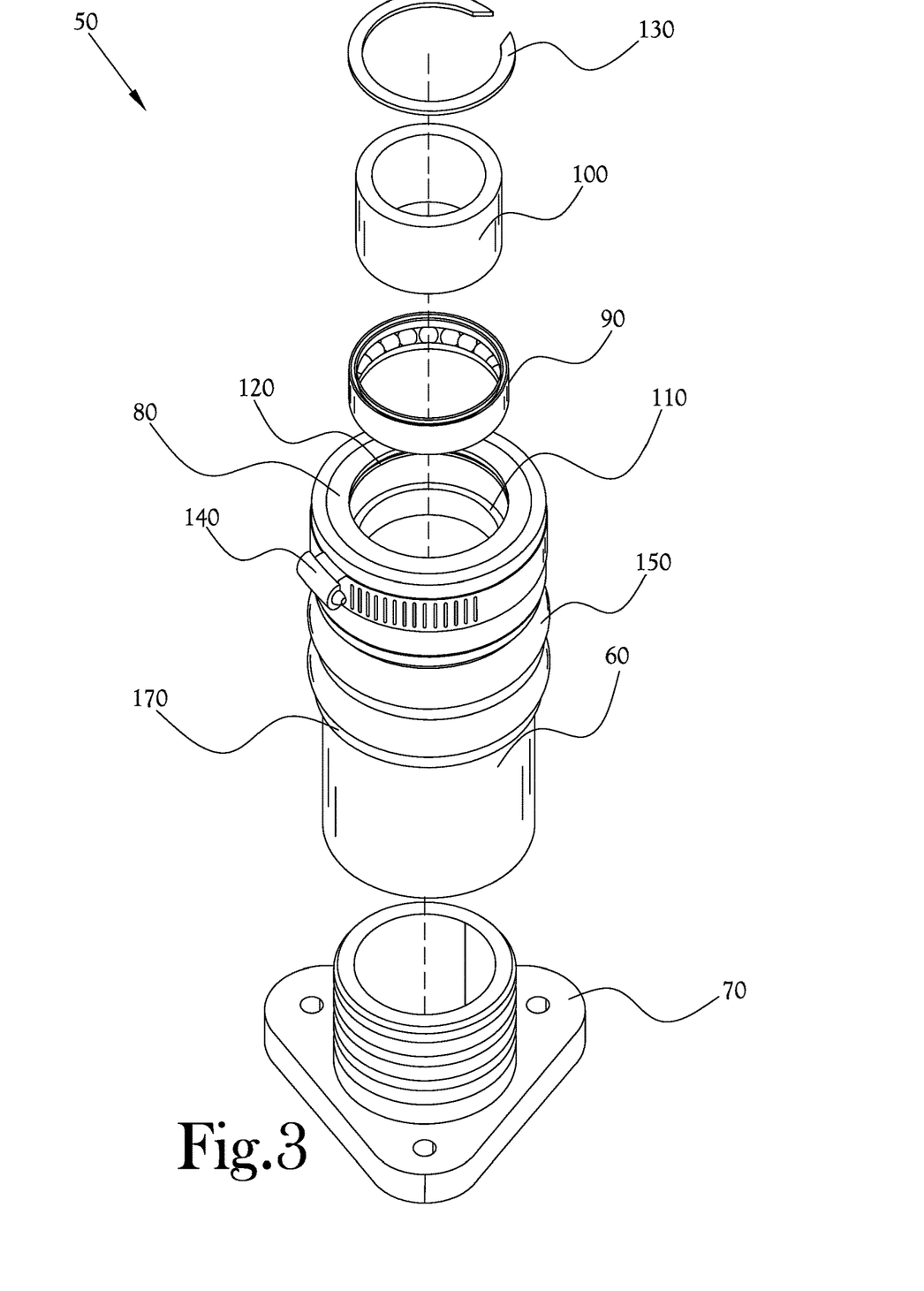
FIG. 3 illustrates a partially exploded view of the boat shaft seal system of FIG. 2.
Figure 4:
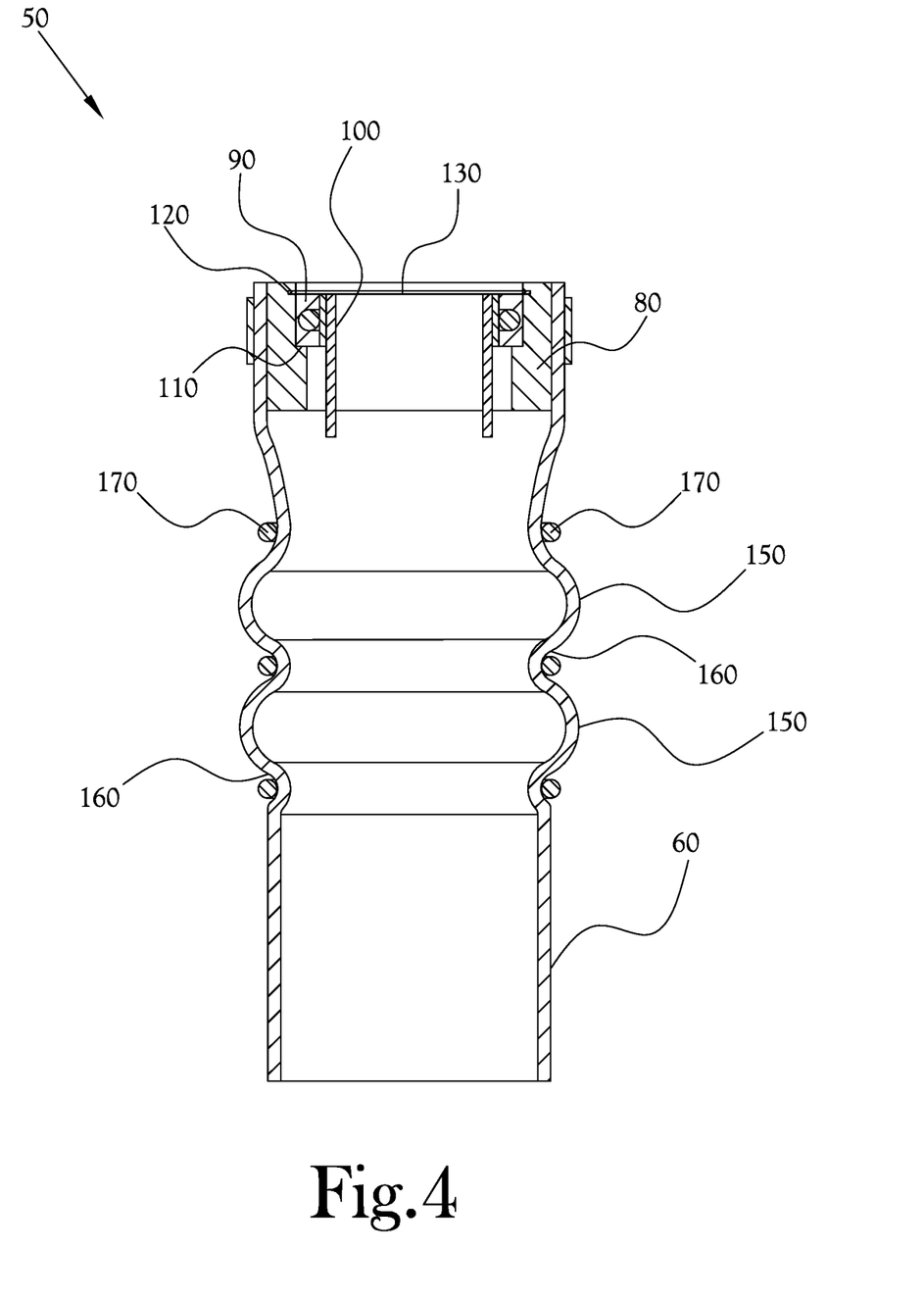
FIG. 4 illustrates a cross section of a portion of the boat shaft seal system of FIG. 2.

FIG. 2 illustrates a perspective view of a boat shaft seal system according to an example embodiment of the present general inventive concept, FIG. 3 illustrates a partially exploded view of the boat shaft seal system of FIG. 2, and FIG. 4 illustrates a cross section of a portion of the boat shaft seal system of FIG. 2. As illustrated in these drawings, the boat shaft seal system 50 includes a flexing gland 60 that is open at a first end and configured to receive a fitting member 70 that is attached at the shaft log of the boat. A second end, or distal end, of the flexing gland 60 is configured to hold an adapter 80 configured maintain a fixed position inside the flexing gland 60 and to house a rolling element bearing 90 that is configured to allow the drive shaft to spin therein. Thus, the inner diameter of the adapter 80 is configured to securely hold the rolling element bearing 90 (or ring bearing, roller bearing, rotary bearing, etc.), which has an internal race 100 that is configured to form a friction fit about the drive shaft, and to therefore spin inside the ring bearing 90 along with the drive shaft. As illustrated in FIG. 4, the inner diameter of the adapter 80 may be formed with a flange 110 or stepped down portion upon which the ring bearing 90 sits. The inner diameter of the adapter 80 may also be formed with a circumferential groove 120 that is configured to hold a securing member 130, such as a lock ring or key ring, immediately above and abutting a top of the ring bearing 90 to secure the ring bearing 90 in place inside the adapter 80. As illustrated, a clamp ring 140 may be provided outside the second end of the flexing gland 60 and around the adapter 80 to fix the adapter 80 in place. Thus, in an assembly according to an example embodiment of the present general inventive concept, the ring bearing 90 may be placed inside the adapter 80 contacting the flange 110, and then locked into place with the securing member 130 so as to maintain the position inside the adapter 80. It is understood that various other assemblies and spinning bearing components may be utilized without departing from the scope of the present general inventive concept. For example, in various example embodiments a rolling element bearing could be formed to fit inside the second end of the flexing gland and maintain position without an adapter, and in some example embodiments be further secured by a tension device or member such as a clamp ring or other device.

As illustrated in FIGS. 2-4, the flexing gland 60 is formed with a plurality of humps or ribs 150 that extend outward from the general diameter of the flexing gland 60. The ribs 150 are further defined by pinch points 160 at sides of the ribs 150, and the pinch points 160 may receive rings 170 to provide further structure to the ribbed form of the flexing gland 60. In various example embodiments, the rings 170 may be sized or otherwise formed to help control a degree of flexibility between two or more of the ribs, and in some example embodiments ribs of different sizes may be provided on the same flexing gland to affect the flexing at different portions of the flexing gland. With such an arrangement, the flexing gland 60 is able to easily and controllably flex to accommodate fore, aft, and lateral articulation to support the drive shaft. The ribs 150 allow flexing of the flexing gland 60 while still controlling an amount of the flexing, providing the extra structural support that allows the omission of any rigid guide member such as that provided in the conventional seal assembly. Therefore, while the flexing gland 60 is formed to be able to flex in several directions, the interaction of the ribs 150 eventually limit the flexing of the flexing gland 60. As the diameter of the received boat drive shaft will be roughly equal to the inside diameter of the internal race 100, it is evident from the example embodiment illustrated in FIG. 4 that there is ample room inside the flexing gland 60 to allow for flexing in several directions without causing the type of friction that calls for water cooling in conventional boat shaft seal systems.

Figure 5A:
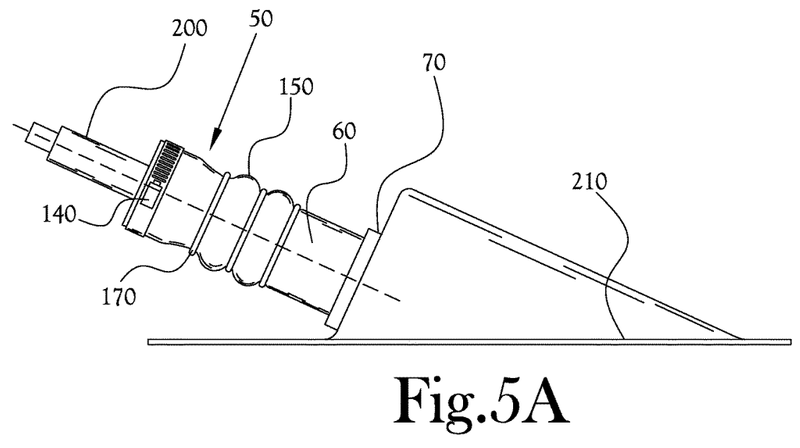
FIGS. 5A-B illustrate the boat shaft seal system of FIG. 2 mounted on a boat drive shaft according to an example embodiment of the present general inventive concept.
Figure 5B:
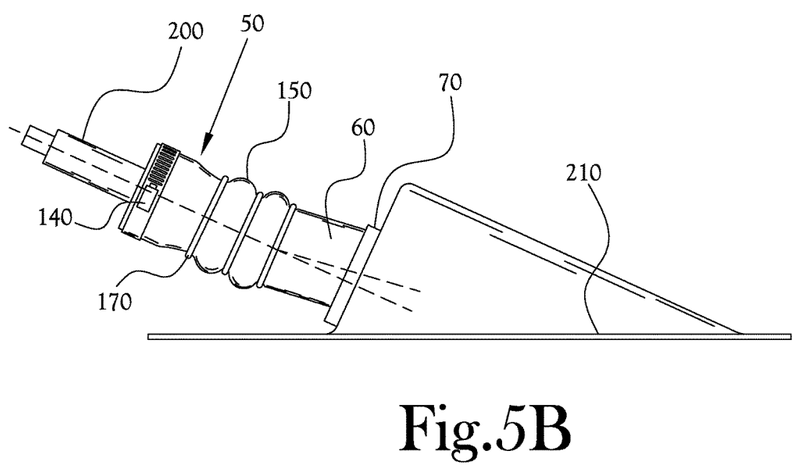

FIGS. 5A-B illustrate the boat shaft seal system 50 of FIG. 2 mounted on a boat drive shaft 200 according to an example embodiment of the present general inventive concept. As illustrated, the boat shaft seal system 50 is affixed to the boat hull 210 by the fitting member 70, and the boat drive shaft 200 extends therethrough. FIG. 5A shows the seal system 50 under no flexure from the drive shaft 200, while FIG. 5B shows the seal system 50 flexing along with the drive shaft 200, but still substantially maintaining structure and controlling the amount of flex. In other words, the flexing gland 60 can flex while maintaining most of the inner diameter area, not contacting the drive shaft 200. Thus, while example embodiments of the present general inventive concept not only eliminate the need to have liquid cooling in the seal system 50 assembly, the seal assembly also helps adjust for misalignment of the drive shaft 200. No housing or through piece is needed inside the seal assembly 50, and thus there is no rubbing of such a part by the drive shaft 200. While two ribs 150 are illustrated in the drawings described herein, it is understood that any number of ribs may be provided without departing from the scope of the present general inventive concept.

Various example embodiments of the present general inventive concept may provide a boat shaft seal system including a flexing gland configured to receive a boat drive shaft therethrough, the flexing gland having a first end configured to receive a shaft log fitting, and a second end configured such that the boat drive shaft extends therefrom, and a plurality of circumferential ribs formed along at least a portion of a length of the flexing gland and configured to allow limited flexing of the flexing gland. The ribs may be formed with pinch points at either side thereof. The boat shaft seal system may further include structural rings provided in each of the pinch points. The boat shaft seal system may further include a rotary bearing provided in the second end of the flexing gland and configured to allow rotary movement of the boat drive shaft within the flexing gland. The rotary bearing may be configured to maintain a rotating position of the boat drive shaft such that the boat drive shaft does not contact an interior of the flexing gland. The boat shaft seal system may further include a tension member provided on an exterior of the flexing gland proximate the second end of the flexing gland and configured to secure the rotary bearing in position. The tension member may be a clamp ring. The boat shaft seal system may further include an adapter fitted inside the second end of the flexing gland and configured to hold the rotary bearing. The adapter may be formed with a flange to support a first end of the rotary bearing. The boat shaft seal system may further include a securing member configured to contact a second end of the rotary bearing to secure the rotary bearing in the adapter, wherein a recess is formed in an inner diameter of the adapter to receive the securing member such that the rotary bearing is secured in place in the adapter. The securing member may be a lock ring, and the recess may be a circumferential groove configured to receive the securing member such that it contacts the second end of the rotary bearing. The boat shaft seal system may further include an internal race configured to fit inside the rotary bearing and form a friction fit with the boat drive shaft. The boat shaft seal system may further include a tension member provided on an exterior of the flexing gland proximate the second end of the flexing gland and configured to secure the adapter in position. The boat shaft seal system may further include an internal race configured to fit inside the rotary bearing and form a friction fit with the boat drive shaft, an external surface of the internal race contacting an inner diameter of the rotary bearing, and an internal surface of the internal race contacting an outer diameter of the boat drive shaft. The innermost end of the internal race may terminate short of any of the circumferential ribs. The rotary bearing may be arranged in the second end of the flexing gland so as to prevent water from entering the flexing gland. The first end of the flexing gland may be configured to fit the shaft log fitting so as to prevent water from entering the flexing gland. The flexing gland may be formed continuously along the outer diameter such that only the first and second ends provide access to an interior of the flexing gland.

Various example embodiments of the present general inventive concept may provide a boat shaft seal system including a flexing gland having a first end configured to be coupled to a boat hull over a boat drive shaft, and a second end configured such that the boat drive shaft passes therethrough, one or more circumferential ribs formed along at least a portion of the flexing gland and configured to allow limited flexing of the flexing gland, a plurality of structural rings provided on either side of each of the one or more circumferential ribs, a rotary bearing having an internal race configured fit the boat drive shaft and allow rotary movement of the boat drive shaft, an adapter arranged in the second end of the flexing gland such that an outer diameter of the adapter contacts an inner diameter of the flexing gland, and configured such that an inner diameter of the adapter contacts an outer diameter of the rotary bearing, and a tension member provided proximate the second end of the flexing gland and configured to contact an outer diameter of the second end of the flexing gland so as to secure the adapter in position. The flexing gland may be formed continuously along the outer diameter such that only the first and second ends provide access to an interior of the flexing gland.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A boat shaft seal system, comprising:
  a flexing gland configured to receive a boat drive shaft therethrough, the flexing gland having a first end configured to receive a shaft log fitting, and a second end configured such that the boat drive shaft extends therefrom;

a plurality of circumferential ribs formed along at least a portion of a length of the flexing gland and configured to allow limited flexing of the flexing gland;

a rotary bearing provided in the second end of the flexing gland and configured to allow rotary movement of the boat drive shaft within the flexing gland;

an adapter fitted inside the second end of the flexing gland and configured to hold the rotary bearing, wherein the adapter is formed with a flange to support a first end of the rotary bearing; and a securing member configured to contact a second end of the rotary bearing to secure the rotary bearing in the adapter, wherein a recess is formed in an inner diameter of the adapter to receive the securing member such that the rotary bearing is secured in place in the adapter.

2. The boat shaft seal system of claim 1, wherein the ribs are formed with pinch points at either side thereof.

3. The boat shaft seal system of claim 2, further comprising structural rings provided in each of the pinch points.

4. The boat shaft seal system of claim 1, wherein the rotary bearing is configured to maintain a rotating position of the boat drive shaft such that the boat drive shaft does not contact an interior of the flexing gland.

5. The boat shaft seal system of claim 1, further comprising a tension member provided on an exterior of the flexing gland proximate the second end of the flexing gland and configured to secure the rotary bearing in position.

6. The boat shaft seal system of claim 5, wherein the tension member is a clamp ring.

7. The boat shaft seal system of claim 1, wherein the securing member is a lock ring, and the recess is a circumferential groove configured to receive the securing member such that it contacts the second end of the rotary bearing.

8. The boat shaft seal system of claim 7, further comprising an internal race configured to fit inside the rotary bearing and form a friction fit with the boat drive shaft.

9. The boat shaft seal system of claim 1, further comprising a tension member provided on an exterior of the flexing gland proximate the second end of the flexing gland and configured to secure the adapter in position.

10. The boat shaft seal system of claim 1, further comprising an internal race configured to fit inside the rotary bearing and form a friction fit with the boat drive shaft, an external surface of the internal race contacting an inner diameter of the rotary bearing, and an internal surface of the internal race contacting an outer diameter of the boat drive shaft.

11. The boat shaft seal system of claim 10, wherein an innermost end of the internal race terminates short of any of the circumferential ribs.

12. The boat shaft seal system of claim 1, wherein the rotary bearing is arranged in the second end of the flexing gland so as to prevent water from entering the flexing gland.

13. The boat shaft seal system of claim 12, wherein the first end of the flexing gland is configured to fit the shaft log fitting so as to prevent water from entering the flexing gland.

14. The boat shaft seal system of claim 1, wherein the flexing gland is formed continuously along the outer diameter such that only the first and second ends provide access to an interior of the flexing gland.

15. A boat shaft seal system, comprising:

a flexing gland having a first end configured to be coupled to the shaft log of a boat hull over a boat drive shaft, and a second end configured such that the boat drive shaft passes therethrough;

one or more circumferential ribs formed along at least a portion of the flexing gland and configured to allow limited flexing of the flexing gland;

a plurality of structural rings provided on either side of each of the one or more circumferential ribs;

a rotary bearing having an internal race configured fit the boat drive shaft and allow rotary movement of the boat drive shaft;

an adapter arranged in the second end of the flexing gland such that an outer diameter of the adapter contacts an inner diameter of the flexing gland, and configured such that an inner diameter of the adapter contacts an outer diameter of the rotary bearing;

a securing member configured to contact a second end of the rotary bearing to secure the rotary bearing in the adapter, wherein a recess is formed in an inner diameter of the adapter to receive the securing member such that the rotary bearing is secured in place in the adapter; and a tension member provided proximate the second end of the flexing gland and configured to contact an outer diameter of the second end of the flexing gland so as to secure the adapter in position.

16. The boat shaft seal system of claim 15, wherein the flexing gland is formed continuously along the outer diameter such that only the first and second ends provide access to an interior of the flexing gland.

* * * * *